(12) United States Patent
Kley (10) Patent No.: US 7,178,387 B1
(45) Date of Patent: Feb. 20, 2007

(54) METHOD AND APPARATUS FOR SCANNING IN SCANNING PROBE MICROSCOPY AND PRESENTING RESULTS

(75) Inventor: Victor B. Kley, Berkeley, CA (US)

(73) Assignee: General Nanotechnology LLC, Berkeley, CA (US)

( * ) Notice: Subject to any disclaimer, the term of this patent is extended or adjusted under 35 U.S.C. 154(b) by 0 days.

(21) Appl. No.: 10/866,642

(22) Filed: Jun. 10, 2004

Related U.S. Application Data (62) Division of application No. 10/094,148, filed on Mar. 7, 2002, now Pat. No. 6,752,008.

(60) Provisional application No. 60/350,145, filed on Oct. 19, 2001, provisional application No. 60/287,677, filed on Apr. 30, 2001, provisional application No. 60/274,501, filed on Mar. 8, 2001.

(51) Int. Cl.
*H01J 37/00* (2006.01)

(52) U.S. Cl. .......................................... 73/105; 73/105

(58) Field of Classification Search .................. 73/105; 250/306, 307; 324/200, 226, 227, 457; 374/100, 137
See application file for complete search history.

(56) References Cited

U.S. PATENT DOCUMENTS

| | | | |
|---|---|---|---|
| 3,586,865 A | 6/1971 | Baker et al. | |
| 3,812,288 A | 5/1974 | Walsh et al. | |
| 4,115,806 A | 9/1978 | Morton | |
| 4,604,520 A | 8/1986 | Pohl | |
| 4,672,559 A | 6/1987 | Jansson et al. | |
| 4,673,477 A | 6/1987 | Ramalingram et al. | |
| RE32,457 E | 7/1987 | Matey | |
| 4,681,451 A | 7/1987 | Guerra et al. | |
| 4,697,594 A | 10/1987 | Mayo, Jr. | |
| 4,793,201 A | 12/1988 | Kanai et al. | |
| 4,831,614 A | 5/1989 | Duerig | |
| 4,866,986 A | 9/1989 | Cichanski | |
| 4,874,946 A * | 10/1989 | Kazmerski | 250/309 |
| 4,907,195 A | 3/1990 | Kazan et al. | |

(Continued)

FOREIGN PATENT DOCUMENTS

JP 61-133065 6/1986

(Continued)

OTHER PUBLICATIONS

Ager et al., "Multilayer hard carbon films with low wear rates," *Surface and Coatings Technology*, 91:91-94 (1997).

(Continued)

*Primary Examiner*—Robert Raevis
(74) *Attorney, Agent, or Firm*—Townsend and Townsend and Crew LLP (57) ABSTRACT

Information is collected from a region of interest using a scanning probe microscope having a tip by moving the tip along at least one predefined path extending from a center location to a peripheral location in the region of interest and collecting information using the tip at a plurality of sample points along the at least one predefined path. The predefined path may be based on a radial line defined between the center location and the peripheral location, and may follow a zig-zag, sinusoidal, constant-curve, rectangular trajectory generally tracking the radial line.

10 Claims, 9 Drawing Sheets

U.S. PATENT DOCUMENTS

| | | |
|---|---|---|
| 4,924,091 A | 5/1990 | Hansma et al. |
| 4,954,704 A | 9/1990 | Elings et al. |
| 4,999,495 A | 3/1991 | Miyata et al. |
| 5,001,344 A | 3/1991 | Kato et al. |
| 5,010,249 A | 4/1991 | Nishikawa |
| 5,015,850 A | 5/1991 | Zdeblick |
| 5,018,865 A | 5/1991 | Ferrell et al. |
| 5,025,346 A | 6/1991 | Tang |
| 5,038,322 A | 8/1991 | Van Loenen |
| 5,043,577 A | 8/1991 | Pohl |
| 5,047,633 A | 9/1991 | Finlan et al. |
| 5,047,649 A | 9/1991 | Hodgson et al. |
| 5,072,116 A | 12/1991 | Kawade et al. |
| 5,081,390 A | 1/1992 | Elings |
| 5,105,305 A | 4/1992 | Betzig et al. |
| 5,107,112 A | 4/1992 | Yanagisawa et al. |
| 5,108,865 A | 4/1992 | Zwaldo et al. |
| 5,118,541 A | 6/1992 | Yamamoto et al. |
| 5,138,159 A | 8/1992 | Takase et al. |
| 5,142,145 A | 8/1992 | Yasutake |
| 5,148,307 A | 9/1992 | Kopelman |
| 5,155,589 A | 10/1992 | Gere |
| 5,166,520 A | 11/1992 | Prater et al. |
| 5,187,367 A | 2/1993 | Miyazaki |
| RE34,214 E | 4/1993 | Carlsson et al. |
| 5,210,410 A | 5/1993 | Barrett |
| 5,216,631 A | 6/1993 | Sliwa |
| 5,220,555 A | 6/1993 | Yanagisawa |
| 5,231,286 A | 7/1993 | Kajimura et al. |
| RE34,331 E * | 8/1993 | Elings et al. ............... 250/306 |
| 5,241,527 A | 8/1993 | Eguchi |
| 5,249,077 A | 9/1993 | Laronga |
| 5,252,835 A | 10/1993 | Lieber et al. |
| 5,253,515 A | 10/1993 | Toda et al. |
| 5,254,209 A | 10/1993 | Schmidt et al. |
| 5,254,854 A | 10/1993 | Betzig |
| 5,260,824 A | 11/1993 | Okada et al. |
| 5,276,672 A | 1/1994 | Miyazaki |
| 5,278,704 A | 1/1994 | Matsuda |
| 5,283,437 A | 2/1994 | Greshner et al. |
| 5,289,004 A | 2/1994 | Okada et al. |
| 5,289,408 A | 2/1994 | Mimura |
| 5,297,130 A | 3/1994 | Tagawa |
| 5,299,184 A | 3/1994 | Yamano |
| 5,302,239 A | 4/1994 | Roe et al. |
| 5,307,311 A | 4/1994 | Sliwa |
| 5,308,974 A | 5/1994 | Elings et al. |
| 5,317,152 A | 5/1994 | Takamatsu |
| 5,317,533 A | 5/1994 | Quate |
| 5,319,961 A | 6/1994 | Matsuyama et al. |
| 5,319,977 A | 6/1994 | Quate et al. |
| 5,322,735 A | 6/1994 | Fridez et al. |
| RE34,708 E | 8/1994 | Hansma et al. |
| 5,338,932 A | 8/1994 | Theodore et al. |
| 5,343,460 A | 8/1994 | Miyazaki |
| 5,349,735 A | 9/1994 | Kawase |
| 5,353,632 A | 10/1994 | Nakagawa |
| 5,354,985 A | 10/1994 | Quate |
| 5,357,109 A | 10/1994 | Kusumoto |
| 5,357,110 A | 10/1994 | Statham |
| 5,360,977 A | 11/1994 | Onuki et al. |
| 5,362,963 A | 11/1994 | Kopelman et al. |
| 5,373,494 A | 12/1994 | Kawagishi |
| 5,389,475 A | 2/1995 | Yanagisawa |
| 5,392,275 A | 2/1995 | Kawada et al. |
| 5,393,647 A | 2/1995 | Neukermans et al. |
| 5,396,483 A | 3/1995 | Matsuda |
| 5,408,094 A | 4/1995 | Kajimura |
| 5,412,641 A | 5/1995 | Shinjo |
| 5,414,260 A | 5/1995 | Takimoto et al. |
| 5,414,690 A | 5/1995 | Shido et al. |
| 5,416,331 A | 5/1995 | Ichikawa et al. |
| 5,418,363 A | 5/1995 | Elings et al. |
| 5,426,631 A | 6/1995 | Miyazaki et al. |
| 5,453,970 A | 9/1995 | Rust et al. |
| 5,455,420 A | 10/1995 | Ho et al. |
| 5,461,605 A | 10/1995 | Takimoto |
| 5,463,897 A | 11/1995 | Prater et al. |
| 5,471,458 A | 11/1995 | Oguchi et al. |
| 5,472,881 A | 12/1995 | Beebe et al. |
| 5,490,132 A | 2/1996 | Yagi et al. |
| 5,495,109 A | 2/1996 | Lindsay et al. |
| 5,502,306 A | 3/1996 | Meisburger et al. |
| 5,506,829 A | 4/1996 | Yagi |
| 5,510,615 A | 4/1996 | Ho et al. |
| 5,519,686 A | 5/1996 | Yanagisawa et al. |
| 5,548,117 A | 8/1996 | Nakagawa |
| 5,559,328 A | 9/1996 | Weiss et al. |
| 5,560,244 A | 10/1996 | Prater et al. |
| 5,583,286 A | 12/1996 | Matsuyama |
| 5,602,820 A | 2/1997 | Wickramasinghe et al. |
| 5,610,898 A | 3/1997 | Takimoto |
| 5,623,476 A | 4/1997 | Eguchi |
| 5,634,230 A | 6/1997 | Maurer |
| 5,644,512 A | 7/1997 | Chernoff et al. |
| 5,679,952 A | 10/1997 | Lutwyche et al. |
| 5,717,680 A | 2/1998 | Yamano |
| 5,721,721 A | 2/1998 | Yanagisawa |
| 5,751,683 A | 5/1998 | Kley |
| 5,756,997 A | 5/1998 | Kley |
| 5,763,879 A | 6/1998 | Zimmer et al. |
| 5,804,709 A | 9/1998 | Bougoin et al. |
| 5,821,410 A | 10/1998 | Xiang et al. |
| 5,825,670 A * | 10/1998 | Chernoff et al. ............... 702/85 |
| 5,865,978 A | 2/1999 | Cohen |
| 5,874,726 A | 2/1999 | Haydon |
| 5,883,387 A | 3/1999 | Matsuyama et al. |
| 5,922,214 A | 7/1999 | Liu et al. |
| 6,031,756 A | 2/2000 | Gimzewski et al. |
| 6,064,201 A * | 5/2000 | Cha et al. .................. 324/228 |
| 6,066,265 A | 5/2000 | Galvin et al. |
| 6,087,659 A * | 7/2000 | Adler et al. ................. 250/310 |
| 6,101,164 A | 8/2000 | Kado et al. |
| 6,144,028 A | 11/2000 | Kley |
| 6,173,604 B1 | 1/2001 | Xiang et al. |
| 6,199,269 B1 | 3/2001 | Greco et al. |
| 6,201,226 B1 | 3/2001 | Shimada |
| 6,229,138 B1 | 5/2001 | Kley |
| 6,229,607 B1 | 5/2001 | Shirai et al. |
| 6,229,609 B1 | 5/2001 | Muramatsu et al. |
| 6,232,597 B1 | 5/2001 | Kley |
| 6,239,426 B1 | 5/2001 | Muramatsu et al. |
| 6,242,734 B1 | 6/2001 | Kley |
| 6,249,747 B1 | 6/2001 | Binnig et al. |
| 6,252,226 B1 | 6/2001 | Kley |
| 6,265,711 B1 | 7/2001 | Kley |
| 6,281,491 B1 | 8/2001 | Kley |
| 6,337,479 B1 | 1/2002 | Kley |
| 6,339,217 B1 | 1/2002 | Kley |
| 6,340,813 B1 | 1/2002 | Tominaga et al. |
| 6,353,219 B1 | 3/2002 | Kley |
| 6,369,379 B1 | 4/2002 | Kley |
| 6,396,054 B1 | 5/2002 | Kley |
| 6,507,553 B2 | 1/2003 | Kley |
| 6,515,277 B1 | 2/2003 | Kley |
| 6,517,249 B1 | 2/2003 | Doll |
| 6,573,369 B2 | 6/2003 | Henderson et al. |
| 6,614,227 B2 | 9/2003 | Ookubo |
| 6,724,712 B2 | 4/2004 | Kley |
| 6,737,331 B1 | 5/2004 | Lewis et al. |
| 6,752,008 B1 | 6/2004 | Kley |
| 6,787,768 B1 | 9/2004 | Kley et al. |
| 6,802,646 B1 | 10/2004 | Kley |
| 6,813,937 B2 | 11/2004 | Kley |

| | | | |
|---|---|---|---|
| 2002/0007667 | A1 | 1/2002 | Pohl et al. |
| 2002/0117611 | A1 | 8/2002 | Kley |
| 2002/0135755 | A1 | 9/2002 | Kley |
| 2002/0189330 | A1 | 12/2002 | Mancevski et al. |
| 2003/0012657 | A1 | 1/2003 | Marr et al. |
| 2003/0027354 | A1 | 2/2003 | Geli |
| 2003/0062193 | A1 | 4/2003 | Thaysen et al. |
| 2003/0089182 | A1 | 5/2003 | Thaysen et al. |
| 2004/0118192 | A1 | 6/2004 | Kley |

FOREIGN PATENT DOCUMENTS

| | | |
|---|---|---|
| JP | 1-262403 | 10/1989 |
| JP | 7-105580 | 4/1995 |
| WO | WO 96/03641 A1 | 2/1996 |
| WO | WO 97/04449 | 2/1997 |
| WO | WO 98/34092 A2 | 8/1998 |
| WO | WO 01/03157 | 1/2001 |

OTHER PUBLICATIONS

Betzig et al "Near-Field Optics: Microscopy Spectroscopy and Surface Modification Beyond the Diffraction Limit" Science 257:(Jul. 1992).

Dai et al. "Nanotubes as nanoprobes in scanning probe microscopy," Nature 384:147-150 (Nov. 1996).

Davis "Deposition characterization and device development in diamond silicon carbide and gallium nitride thin films" J. Vac. Sci. Technol. A 11(4) (Jul./Aug. 1993).

D.C. Diaz et al., An Improved Fabrication Technique for Porous Silicon, Rev. Sci. Instrum.64 (2), pp. 507-509 (Feb. 1993).

Givargizov et al "Growth of diamond particles on sharpened silicon tips" Materials Letters 18:(1993).

Gomyou, H., et al. Effect of Electrochemical Treatments on the Photoluminescence from Porous Silicon, J. Electrochem. Soc., vol. 139, No. 9, pp. L86-L88 (Sep. 1992).

Jaschke et al. "Deposition of Organic Material by the Tip of a Scanning Force Microscope," Langmuir 11:1061-1064 (1995).

Nossarzewska-Orlowska, E., et al., Photoluminescence Properties of Porous Silicon Prepared by Electrochemical Etching of Si Epitaxial Layer, Acta Physica Polonica A, No. 4 vol. 84, pp. 713-716 (1993).

Rasmussen et al. "Fabrication of an All-metal Atomic Force Microscope Probe," IEEE (1997).

Rossow, U., et al., Influence of the Formation Conditions on the Microstructure of Porous Silicon Layers Studied by Spectroscope Ellipsometry, Thin Solid Films, 255, pp. 5-8 (1995).

Smestad, G., et al., Photovoltaic Response in Electrochemically Prepared Photoluminescent Porous Silicon, Solar Energy Materials and Solar Cells, 26, pp. 277-283 (1992).

Tang, William Chi-Keung, "Electrostatic comb drive for resonant sensor and actuator applications," Abstract of dissertation at the University of California at Berkeley (1990).

Toledo-Crow et al "Near-field differential scanning optical microscope with atomic force regulation" Appl. Phys. Lett., 60: (Jun. 1992).

Van Hulst et al "Near-field optical micrscope using a silicon-nitride probe" Appl. Phys. Lett., 62: (Feb. 1993).

Watson et al "The Radiation Patterns of Dielectric Rods-Experiment Theory" Journal of Applied Physics, 19 (Jul. 1948).

* cited by examiner

METHOD AND APPARATUS FOR SCANNING IN SCANNING PROBE MICROSCOPY AND PRESENTING RESULTS

CROSS-REFERENCES TO RELATED APPLICATIONS

This application is a division of U.S. application Ser. No. 10/094,148, filed Mar. 7, 2002 now U.S. Pat. No. 6,752,008, entitled "METHOD AND APPARATUS FOR SCANNING IN SCANNING PROBE MICROSCOPY AND PRESENTING RESULTS," having Victor B. Kley listed as inventor. This application also claims priority from the following provisional applications, the entire disclosures of which are incorporated by reference in their entirety for all purposes:
  U.S. Application No. 60/274,501, filed Mar. 8, 2001 by Victor B. Kley for "Scanning Probe Microscopy and Nanomachining;"
  U.S. Application No. 60/287,677, filed Apr. 30, 2001 by Victor B. Kley for "Scanning Probe Microscopy and Nanomachining;" and
  U.S. Application No. 60/350,145, filed Oct. 19, 2001 by Victor B. Kley for "Scan Technique using Non-Even Raster, Radial, Spiral, Curvilinear, or Vector Pattern Base Motion and a Zig-Zag, Constant Curve, Determinant Motion or a Rectangular Secondary Motion."

The following six U.S. patent applications are incorporated by reference in this application in its entirety for all purposes:
  U.S. patent application Ser. No. 10/094,148, filed Mar. 7, 2002 by Victor B. Kley for "Method and Apparatus for Scanning in Scanning Probe Microscopy and Presenting Results";
  U.S. patent application Ser. No. 10/093,842, filed Mar. 7, 2002 by Victor B. Kley for "Nanomachining Method and Apparatus";
  U.S. patent application Ser. No. 10/094,408, filed Mar. 7, 2002 by Victor B. Kley for "Active Cantilever for Nanomachining and Metrology";
  U.S. patent application Ser. No. 10/094,411, filed Mar. 7, 2002 by Victor B. Kley for "Methods and Apparatus for Nanolapping";
  U.S. patent application Ser. No. 10/094,149, filed Mar. 7, 2002 by Victor B. Kley for "Low Friction Moving Interfaces in Micromachines and Nanomachines"; and
  U.S. patent application Ser. No. 10/093,947, filed Mar. 7, 2002 by Victor B. Kley and Robert T. LoBianco for "Method and Apparatus for Tool and Tip Design for Nanomachining and Measurement".

The following U.S. patents are incorporated by reference in their entirety for all purposes:
  U.S. Pat. No. 6,144,028, issued Nov. 7, 2000 to Victor B. Kley for "Scanning Probe Microscope Assembly and Method for Making Confocal, Spectrophotometric, Near-Field, and Scanning Probe Measurements and Associated Images;"
  U.S. Pat. No. 6,252,226, issued Jun. 26, 2001 to Victor B. Kley for "Nanometer Scale Data Storage Device and Associated Positioning System;"
  U.S. Pat. No. 6,337,479, issued Jan. 8, 2002 to Victor B. Kley for "Object Inspection and/or Modification System and Method;" and
  U.S. Pat. No. 6,339,217, issued Jan. 15, 2002 to Victor B. Kley for "Scanning Probe Microscope Assembly and Method for Making Confocal, Spectrophotometric, Near-Field, and Scanning Probe Measurements and Associated Images."

The disclosure of the following published PCT application is incorporated by reference in its entirety for all purposes:
  WO 01/03157 (International Publication Date: Jan. 11, 2001) based on PCT Application No. PCT/US00/18041, filed Jun. 30, 2000 by Victor B. Kley for "Object Inspection and/or Modification System and Method."

BACKGROUND OF THE INVENTION

This invention is related generally to the field of Atomic Force Microscopy (AFM), Scanning Tunneling Microscopy (STM), Near field Scanning Optical Microscopy (NSOM), NanoSpectroPhotometry (NSP), NanoPolarimetry (NP), Magnetic Field Microscopy (MFM) and any other methods adaptable and suitable to guide the scanning and nanomachining techniques described herein. These technologies are sometimes collectively referred to as Scanning probe Microscopy (SPM). Generally, SPM technologies allow one to "see" atomic-scale features on or in surfaces.

An AFM works by scanning a tip over a surface much the same way as a phonograph needle scans a record. The tip is located at the end of a cantilever beam and positioned over the surface to be scanned. The combination of the cantilever beam and tip is sometimes referred to collectively as a scanning probe or simply a probe.

AFM techniques rely on the effects of the inter-atomic interactions, such as van der Waals forces, that arise between the atoms in the structure of the tip and the atoms at the surface being imaged. As the tip is attracted to the surface, the cantilever beam is deflected. The magnitudes of the deflections correspond to the topological features of the atomic structure of the surface being scanned. The AFM can work with the tip touching the sample (contact mode), or the tip can tap across the surface (tapping mode), or made to not touch the surface at all (non-contact mode, which is the preferred embodiment).

STM techniques rely on the fact that the electron probability cloud associated with the atoms at the surface extends a very small distance above the surface as described by the quantum physical model. When a tip is brought sufficiently close to such a surface, there is an increasingly stronger probability of an interaction (current) between the electron cloud on the surface and that of the tip atom. An electric tunneling current flows when a small voltage is applied. The tunneling current is very sensitive to the distance between the tip and the surface. These changes in the tunneling current with distance as the tip is scanned over the surface are used to produce an image of the surface.

Nanomachining involves removal, addition, or movement of material on a surface in a controlled manner to attain specific surface features. Typically, an appropriate scanning probe is manipulated so that its tip comes into contact with a surface to be nanomachined. The scanning probe is then translated along a pre-programmed vector, producing a scraping action across the contacted surface and removing an amount of material from the surface. An appropriate feed is applied to control the amount of material removed. This is repeated until the desired features are achieved. Any surface which is exposed to contact by the scanning probe can be nanomachined. Thus, for example the walls of a vertical structure can be nanomachined using a scanning probe having an appropriately shaped tip applied to the wall with an appropriate feed force.

Figure 1:
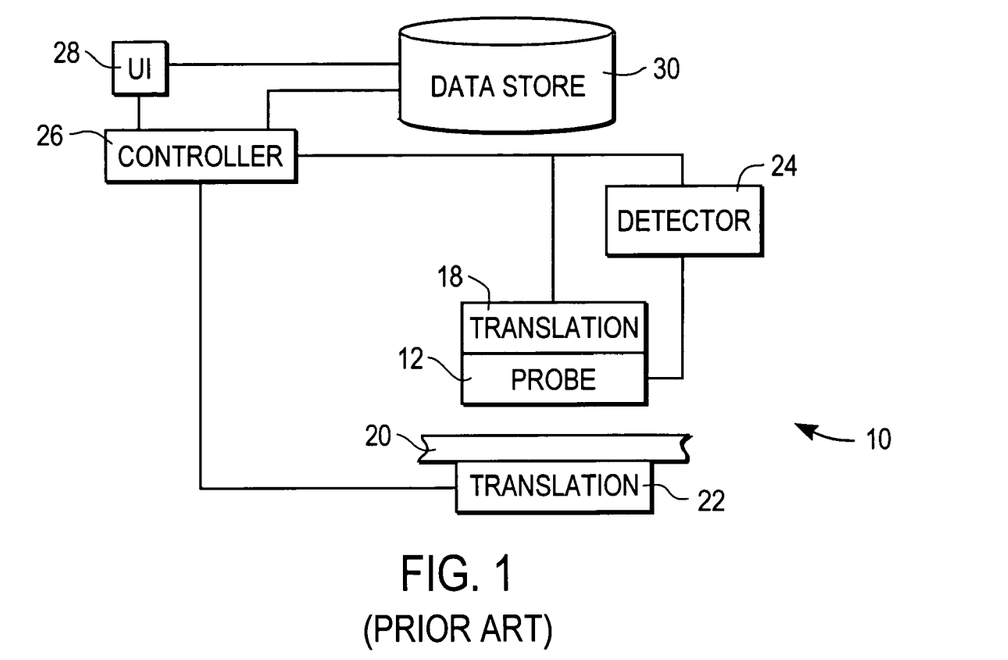
FIG. 1 is a generalized diagram illustrating a typical SPM system.

FIG. 1 is a generalized diagram illustrating a typical SPM system 10. A scanning probe 12 is the workhorse of the SPM. A typical probe comprises a cantilever and a tip disposed at the free end of the cantilever. Various tip shapes and configurations suitable for scanning and nanomachining are disclosed in the various above-identified commonly owned issued patents and commonly owned, co-pending patent applications.

Figure 2:
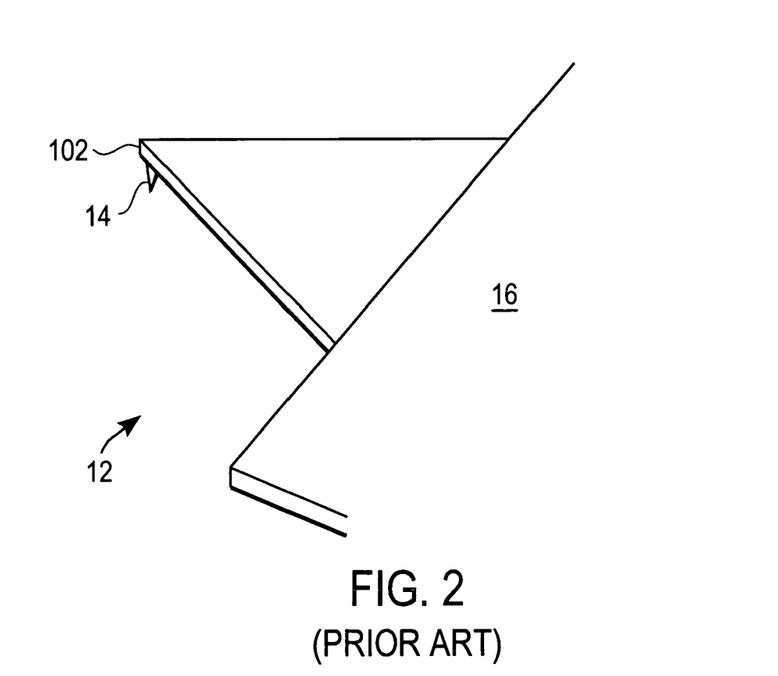
FIG. 2 shows a typical arrangement of a scanning probe suitable for use with the present invention.

FIG. 2 shows a typical arrangement of a scanning probe 12 suitable for use with the present invention. A cantilever 14 is attached to a body member 16 which provides structure for attachment to a probe translation apparatus. Disposed at the free end of the cantilever is an appropriately shaped probe tip 102. The particular dimensions of the probe will vary depending on the particular application.

Referring back to FIG. 1, the probe 12 can be coupled to a first translation stage 18. The first translation stage can provide movement of the probe in the X-Y plane. By convention, the X-Y plane is the plane parallel to the major surface of a workpiece 20. Thus, the probe can be positioned in the X-Y position relative to the workpiece by the first translation stage. The first translation stage can also provide movement of the probe in the Z-direction and thus position the probe in three-dimensional space relative to the workpiece. Such first translation stages are known and well understood devices. Typically, they are piezoelectric devices.

Alternatively or in addition, a second translation stage 22 can be provided. The workpiece 20 can be affixed to the second translation stage to provide X-Y motion of the workpiece relative to the probe 12. Furthermore, the second translation stage can provide motion of the workpiece in the Z direction relative to the probe. Such stages are typically linear motors, or precision ball screw stages or combinations thereof with linear scale or interferometric position feedback.

The relative motion between the probe 12 and the workpiece 20 can be achieved by any of a number of techniques. The probe can be translated in three dimensions while maintaining the workpiece in a stationary position. Conversely, the workpiece can move relative to a stationary probe. Both the probe and the workpiece can be moved in a coordinated fashion to achieve rapid positioning. The first translation stage 104 might provide only X-Y motion, while Z-axis positioning is provided by the second translation stage 106; or vice-versa. These and still other combinations of concerted motions of the probe and the workpiece can be performed to effect relative motion between the probe and the workpiece.

A detection module 24 is coupled to detect signal received from the scan probe 12. Many detection techniques are known. For example, if the probe is operated in AFM (atomic force microscopy) mode, the cantilever resonance point is shifted by the interatomic forces acting between the tip and the surface as the tip is scanned across the surface. A generalized controller 26 can be configured to provide various computer-based functions such as controlling the components of the system 10, performing data collection and subsequent analysis, and so on. Typically, the controller is some computer-based device; for example, common architectures are based on a microcontroller, or a general purpose CPU, or even a custom ASIC-based controller. A user interface 28 is provided to allow a user to interact with the system. The "user" can be a machine user. A machine interface might be appropriate in an automated environment where control decisions are provided by a machine.

A data store 30 contains various information to facilitate scanning and nanomachining operations and for overall operation of the system 10. The data store contains the programming code that executes on the controller 26. The data store shown in the figure can be any appropriate data storage technology, ranging from a single disk drive unit to a distributed data storage system.

Typically, traditional Scanning Probe Microscopy (SPM) and other measurement systems employ a conventional raster scanning technique to collect measurements within a region of interest. Such a conventional raster scanning technique involves taking measurements in rows, referred to as a raster pattern. That is, the region of interest is mapped by a plurality of parallel, equally-spaced scan lines. The tip of a measurement probe begins at the first sample point on the first scan line and moves along the first scan line, collecting data at each sample point, until it finishes collecting data on the last sample point of the first scan line. Then, the tip moves to the first sample point on the second scan line and begins collecting data along the second scan line in a similar fashion. The process thus repeats for the remaining scan lines until the tip completes the last measurement at the last sample point, at the end of the last scan line.

Taking measurements using a conventional raster scanning technique can be extremely time-consuming and inefficient. Such measurements on a region of interest are completed only after the last measurement on the last scan line is made. Scanning in such a fashion can waste time and resources by collecting data at unimportant sample points or inefficiently spaced sample points. For example, measurements may only need to be taken on a particular structure located within the region of interest. However, the exact location of the structure may not be known. There may only be probabilistic information regarding the location of the structure. Furthermore, measurement may only need to be taken on particular regions of the structure. Also, it may be the case that only measurements that fall within certain value ranges are of interest.

With conventional raster scanning techniques, many of these problems cannot be solved by simply adjusting the number of sample points in a scan line or the spacing between scan lines. In a wide range of applications, useful data must be collected with greater speed and efficiency, in a manner that takes into account the type of measurement needed.

BRIEF SUMMARY OF THE INVENTION

A method is presented for collecting information from a region of interest using a scanning probe microscope having a tip. The method comprises moving the tip along at least one predefined path extending from a center location to a peripheral location in the region of interest and collecting information using the tip at a plurality of sample points along the at least one predefined path. In one embodiment, the at least one predefined path is based on a radial line defined between the center location and the peripheral location. The at least one predefined path may follow a zig-zag, sinusoidal, constant-curve, rectangular trajectory generally tracking the radial line.

Another method is presented which comprises moving a tip along at least one predefined path, collecting information using the tip at a plurality of sample points along the predefined path until at least one measurement based on the information collected reaches a target value or a target range of values, moving the tip along a tracking path once the at least one measurement reaches the target value or range of values, and collecting information using the tip at a plurality of sample points along the tracking path.

Yet another method is presented which comprises moving a tip along at least one predefined path, collecting information using the tip at a plurality of sample points along the predefined path, detecting a predetermined pattern using the collected information, and moving the tip to a desired location within the predetermined pattern.

A method is also described for presenting information collected from a region of interest using a scanning probe microscope (SPM). This method comprises displaying a multi-dimensional representation of base data collected in the region of interest at sample points along each of a plurality of parallel scan paths oriented in a first predefined direction and sample points along each of a plurality of parallel scan paths oriented in a second predefined direction, wherein the first predefined direction forms a non-zero angle with the second predefined direction. In one embodiment, the multi-dimensional representation includes interpolated data calculated from the base data for at least one point of interest located in a region bounded by the parallel scan lines.

A further understanding of the nature and advantages of the present invention may be realized by reference to the remaining portions of the specification and the drawings.

DETAILED DESCRIPTION OF THE INVENTION

Introduction

Various scanning patterns are described in different embodiments of the present invention. A scanning pattern defines the movement of the tip of a measurement device within a region of interest to be scanned. Typically, the tip collects measurements at sample points along the scanning pattern. Different types of measurement can be collected, such as surface height, sidewall location (such as the top to bottom edge of a structure which rises in at least one place from the surrounding surface), convex weighted limit (which may be an average of outward going structures, for instance a series of bumps whose average outward limit is some distance n+w), concave weighted limit (which may be an average of inward going structures, for instance a series of recesses whose average inward going limit is m+w), temperature, light intensity, tunnel current, electrical field strength, magnetic field strength, and others.

Radial Zig-Zag

Figure 3A:
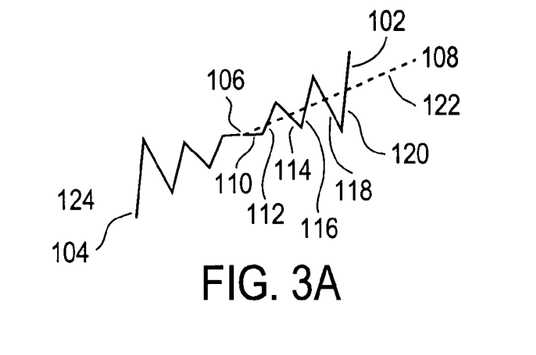
FIG. 3A illustrates a pair of scan paths characteristic of a radial zig-zag scanning pattern.
Figure 3B:
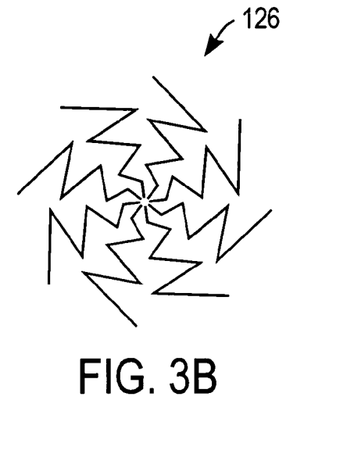
FIG. 3B illustrates a radial zig-zag scanning pattern in accordance with one embodiment of the present invention.

FIG. 3A illustrates a pair of scan paths 102 and 104 characteristic of a radial zig-zag scanning pattern in accordance with one embodiment of the present invention. A number of such scan paths together form a radial zig-zag scanning pattern to cover an entire region of interest to be scanned, as is illustrated in FIG. 3B.

Returning to FIG. 3A, the scan path 102 begins from a center location 106 in the region of interest and follows a zig-zag trajectory toward a peripheral location 108 in the region of interest. The zig-zag trajectory of the scan path 102 comprises consecutively connected linear segments 110, 112, 114, 116, 118, and 120. Since the scan path 102 extends from the center location 106 to the peripheral location 108 in the region of interest, the scan path 102 is said to have a generally radial characteristic. In fact, a radial line 122 can be drawn between the center location 106 and the peripheral location 108. The linear segments 110, 112, 114, 116, 118, and 120 of the scan path 102 each crosses the radial line 122 at a particular angle.

The trajectory of the scan path 102 can be adjusted to change the density with which a particular region is scanned. Specifically, linear segments 110, 112, 114, 116, 118, and 120 can be adjusted to control the length of each line segment and the angle at which each line segment crosses the radial line 122. A line segment that is shorter and more perpendicular to the radial line 122 allows a higher number of samples per unit area scanned and thus higher scan resolution. A line segment that is longer and more parallel to the radial line 122 allows a lower number of samples per unit area scanned and thus lower scan resolution.

Here, the lengths and angles of the linear segments 110, 112, 114, 116, 118, and 120 are designed to produce higher scan resolution near the center location 106 and progressively lower scan resolution toward the peripheral location 108. That is, the closer a linear segment is to the center location 106, the shorter it is and more perpendicular to the radial line 122 it is designed. The farther a linear segment is from the center location 106, the longer it is and more parallel to the radial line 122 it is designed. For example, note that the linear segment 112 is closer to the center location 106 than the linear segment 120. Also note that the linear segment 112 is shorter than the linear segment 120 and is more parallel to the radial line 122 than is the linear segment 120.

In this manner, scan paths can be designed to construct a scanning pattern, such as the scanning pattern shown in FIG. 3B, to take advantage of known information regarding the region of interest. For example, scan paths can be designed to facilitate the search for a target structure expected to be located at a particular high probability position. In such a scenario, the likelihood of finding the structure may decrease at positions further away from the high probability position. By defining the center location 106 to be the high probability position and employing scan paths such as scan path 108, a scanning pattern can be constructed that achieves higher scan resolution near the high probability position and progressively lower scan resolution with distance away from the high probability position.

Thus, locations where the target structure is more likely to be positioned can be scanned with higher resolution, while locations where the target structure is less likely to be positioned can be scanned with lower resolution. A scanning technique thus developed can be much more efficient than techniques that do not take into account known information relating to the target to be scanned.

Referring back to FIG. 3A, the scan path 104 has a similar trajectory as the scan path 102. While the scan path 104 also begins at the center location 106 in the region of interest, it extends to a different periphery location 124. The linear segments of the scan path 104 cross a different radial line (not shown) that can be drawn from the center location 106 to the periphery location 124. While scan paths 102 and 104 are described as extending from the center location 106 to periphery locations, such a description is not intended as restricting the direction in which a measurement proceeds along scan path 102 or 104. For example, a measurement device tip following the scan path 102 can begin at the center location 106 and proceed along the zig-zag trajectory of the scan path 102 toward the periphery location 108. Alternatively, the tip can begin at the periphery location 108 and proceed along the zig-zag trajectory of the scan path 102 toward the center location 106.

FIG. 3B illustrates a radial zig-zag scanning pattern 126 in accordance with one embodiment of the present invention. The radial zig-zag scanning pattern 126 comprises a number of scan paths, such as the scan paths 102 and 104 shown in FIG. 3A, and spans the region of interest to be scanned. Typically, the region of interest is scanned by n scan paths, where n is a positive integer. Here, n is equal to 8, and there are 8 scan paths shown in FIG. 3B. The number n can be varied depending on the application.

Radial Sinusoidal Scanning Pattern

Figures 4A, 4B:
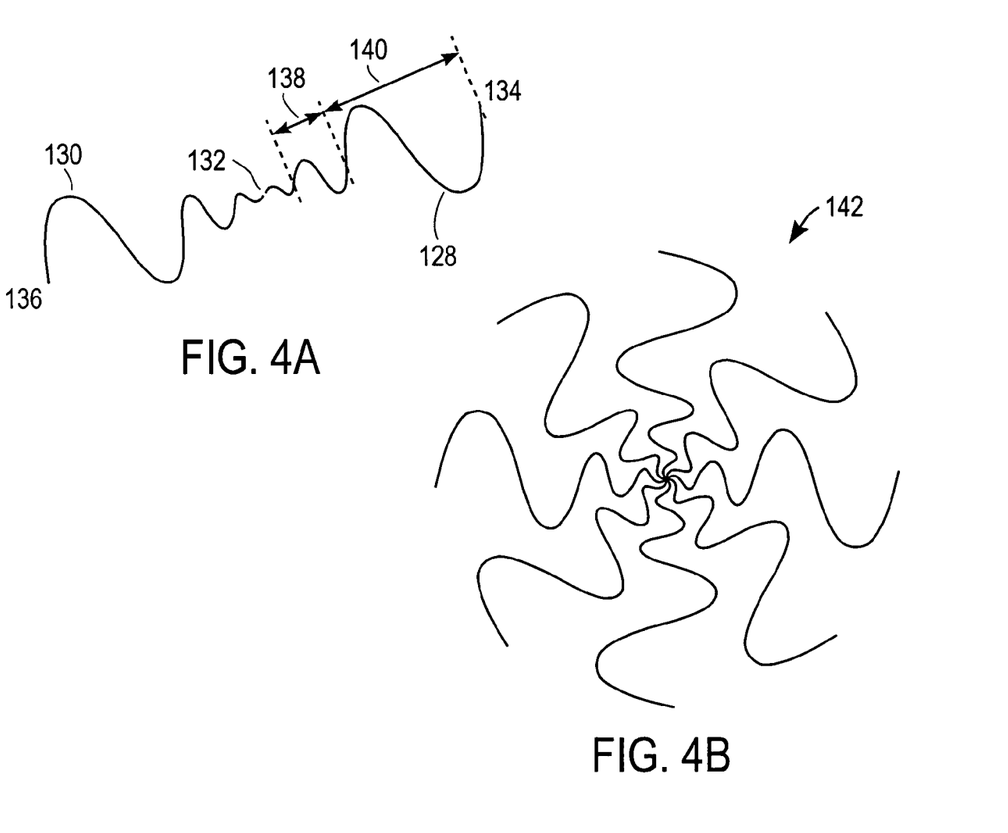
FIG. 4A illustrates a pair of scan paths characteristic of a radial sinusoidal scanning pattern.
FIG. 4B illustrates a radial sinusoidal scanning pattern in accordance with one embodiment of the present invention.

FIG. 4A illustrates a pair of scan paths 128 and 130 characteristic of a radial sinusoidal scanning pattern in accordance with another embodiment of the present invention. A number of such scan paths together form a radial sinusoidal scanning pattern to cover an entire region of interest to be scanned, as is illustrated in FIG. 4B. The scan path paths 128 and 130 both begin at a center location 132 in the region of interest. The scan path 128 extends to a periphery location 134, while the scan path 130 extends to a periphery location 136. Since scan paths 128 and 130 share a common structure, only the scan path 128 will be described below.

The scan path 128 has a sinusoidal shape whose amplitude and period vary with distance away from the center location 132. As the period of the sinusoidal shape becomes greater, the density with which samples are collected from the area covered by the scan path 128 is decreased. For example, in a first area of the scan path 128, the sinusoidal shape of the scan path 128 has a period 138. In a second area of the scan path 128 further away from the center location 132, the sinusoidal shape of the scan path 128 has a greater period 140. The first area corresponds to a denser scanning pattern than the second area. By increasing the period of the sinusoidal shape of the scan path 128 as a function of distance away from the center location 132, the scan path 128 achieves variable scanning density that decreases with distance away from the center location 132. The sinusoidal shape can comprise fixed-period sinusoidal cycles that increase in period. Alternatively, the sinusoidal shape can have a smoothly increasing period (i.e., not strictly sinusoidal).

In a similar fashion as discussed previously with respect to the radial zig-zag scanning pattern, the scan path 128 can be designed to construct a scanning pattern to take advantage of known information regarding the region of interest. Such known information can include probability information relating to the position of a target structure.

FIG. 4B illustrates a radial sinusoidal scanning pattern 142 in accordance with one embodiment of the present invention. The radial sinusoidal scanning pattern 142 comprises a number of scan paths, such as the scan paths 128 and 130 shown in FIG. 4A, and spans the region of interest to be scanned.

Radial Constant-Curve Scanning Pattern

Figure 5A:
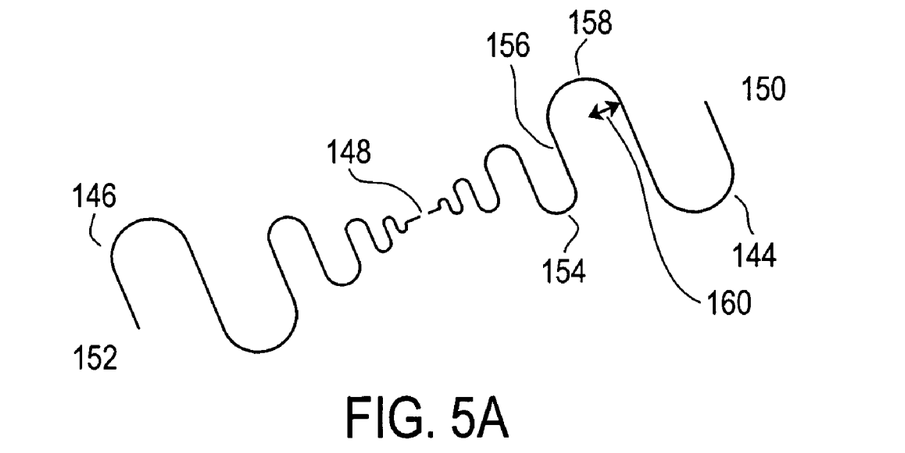
FIG. 5A illustrates a pair of scan paths characteristic of a radial constant-curve scanning pattern.
Figure 5B:
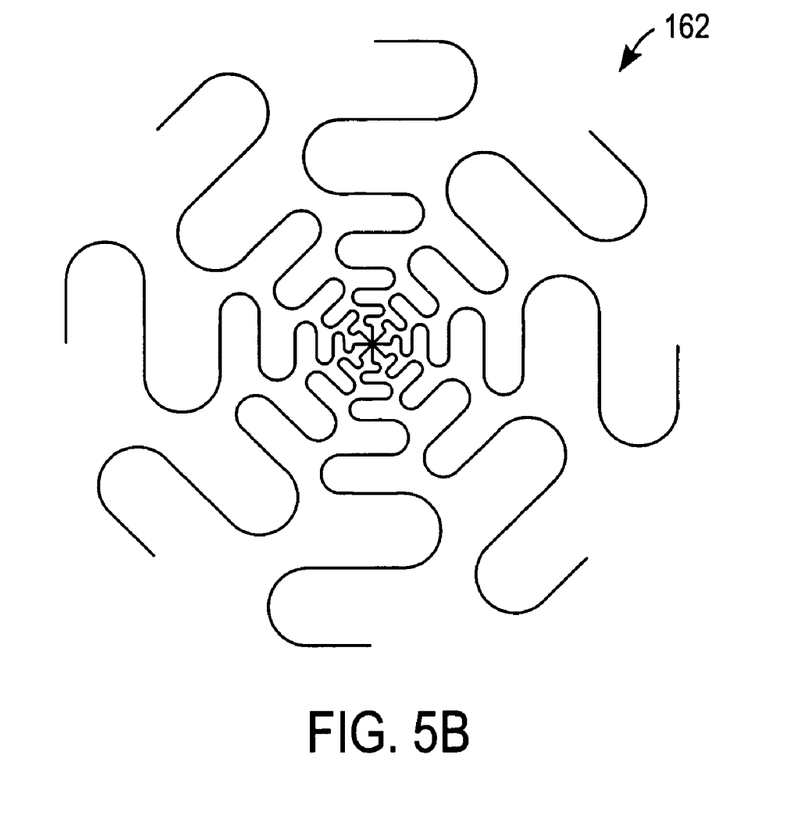
FIG. 5B illustrates a radial constant-curve scanning pattern in accordance with one embodiment of the present invention.

FIG. 5A illustrates a pair of scan paths 144 and 146 characteristic of a radial constant-curve scanning pattern in accordance with another embodiment of the present invention. A number of such scan paths together form a radial constant-curve scanning pattern to cover an entire region of interest to be scanned, as is illustrated in FIG. 5B. The scan path paths 144 and 146 both begin at a center location 148 in the region of interest. The scan path 144 extends to a periphery location 150, while the scan path 146 extends to a periphery location 152. Since scan paths 144 and 146 share a common structure, only the scan path 144 will be described below.

The scan path 144 has a constant-curve shape that comprises consecutively connected and alternating linear portions and curved portions. For example, within the scan path 144, the curved portion 154 is followed by the linear portion 156, which is followed by the curved portion 158. Each linear portion is simply a straight segment. Each curved portion is characterized by a constant curvature. In another words, each curved portion can be seen as a portion of a circle having a corresponding radius, as illustrated by the corresponding radius 160 of the curved portion 158. Such a corresponding radius defines the constant curvature of a particular curved portion. The shorter the radius, the tighter the constant curvature. Thus, the scan path 144 can be varied by controlling the corresponding radius of each curved portion as well as the length of each linear portion.

As the corresponding radius of a curved portion becomes greater, the density with which samples are collected from the region covered by the scan path 144 is decreased. By increasing the corresponding radius of curved portions of the scan path 144 as a function of distance away from the center location 148, the scan path 144 achieves variable scanning density that decreases with distance away from the center location 148. In a similar fashion as discussed previously with respect to the radial zig-zag scanning pattern, the scan path 144 can be designed to construct a scanning pattern to take advantage of known information regarding the region of interest. Such known information can include probability information relating to the position of a target structure.

FIG. 5B illustrates a radial constant-curve scanning pattern 162 in accordance with one embodiment of the present invention. The radial constant-curve scanning pattern 162 comprises a number of scan paths, such as the scan paths 144 and 146 shown in FIG. 5A, and spans the region of interest to be scanned.

Radial Rectangular Scanning Pattern

Figure 6A:
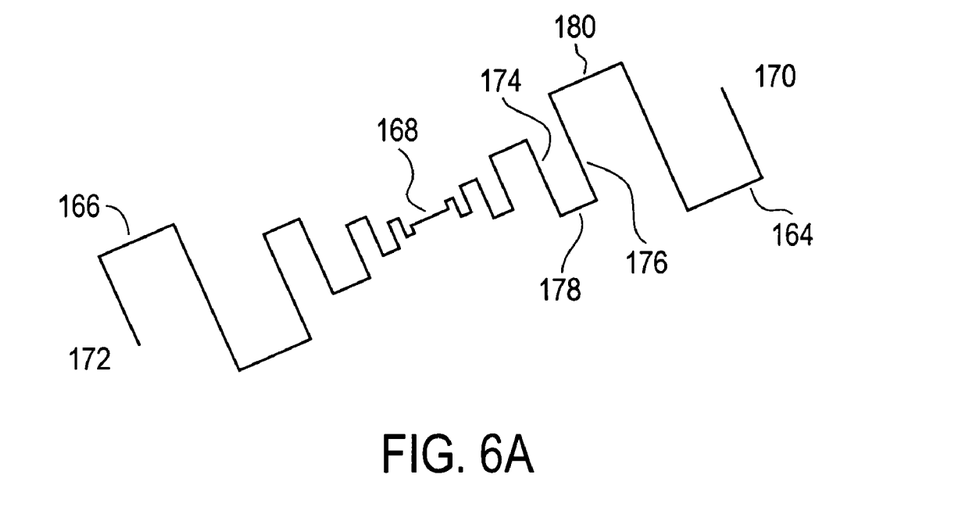
FIG. 6A illustrates a pair of scan paths characteristic of a radial rectangular scanning pattern.
Figure 6B:
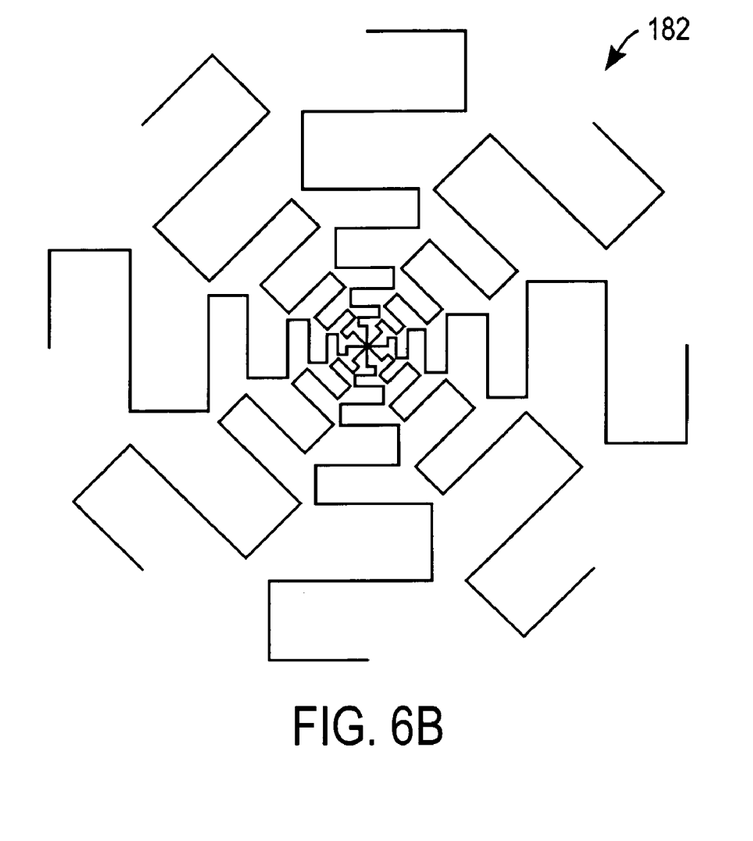
FIG. 6B illustrates a radial rectangular scanning pattern in accordance with one embodiment of the present invention.

FIG. 6A illustrates a pair of scan paths 164 and 166 characteristic of a radial rectangular scanning pattern in accordance with another embodiment of the present invention. A number of such scan paths together form a radial rectangular scanning pattern to cover an entire region of interest to be scanned, as is illustrated in FIG. 6B. The scan path paths 164 and 166 both begin at a center location 168 in the region of interest. The scan path 164 extends to a periphery location 172, while the scan path 166 extends to a periphery location 172. Since scan paths 164 and 166 share a common structure, only the scan path 164 will be described below.

The scan path 164 has a rectangular shape that comprises linear segments connected at right angles. These segments include perpendicular segments, such as perpendicular segment 174 and 176, which cross at right angles with a radial line (not shown) extending from the center location 168 to the peripheral location 170. These segments also include parallel segments, such as parallel segments 178 and 180, which are parallel with the radial line. The lengths of the parallel segments determine the density with which samples are collected from the scanned area. By increasing the length of each parallel segment as a function of distance away from the center location 168, the scan path 164 achieves variable scanning density that decreases with distance away from the center location 168.

In a similar fashion as discussed previously with respect to the radial zig-zag scanning pattern, the scan path 164 can be designed to construct a scanning pattern to take advantage of known information regarding the region of interest. Such known information can include probability information relating to the position of a target structure.

FIG. 6B illustrates a radial rectangular scanning pattern 182 in accordance with one embodiment of the present invention. The radial rectangular scanning pattern 182 comprises a number of scan paths, such as the scan paths 164 and 166 shown in FIG. 6A, and spans the region of interest to be scanned.

Figure 7:
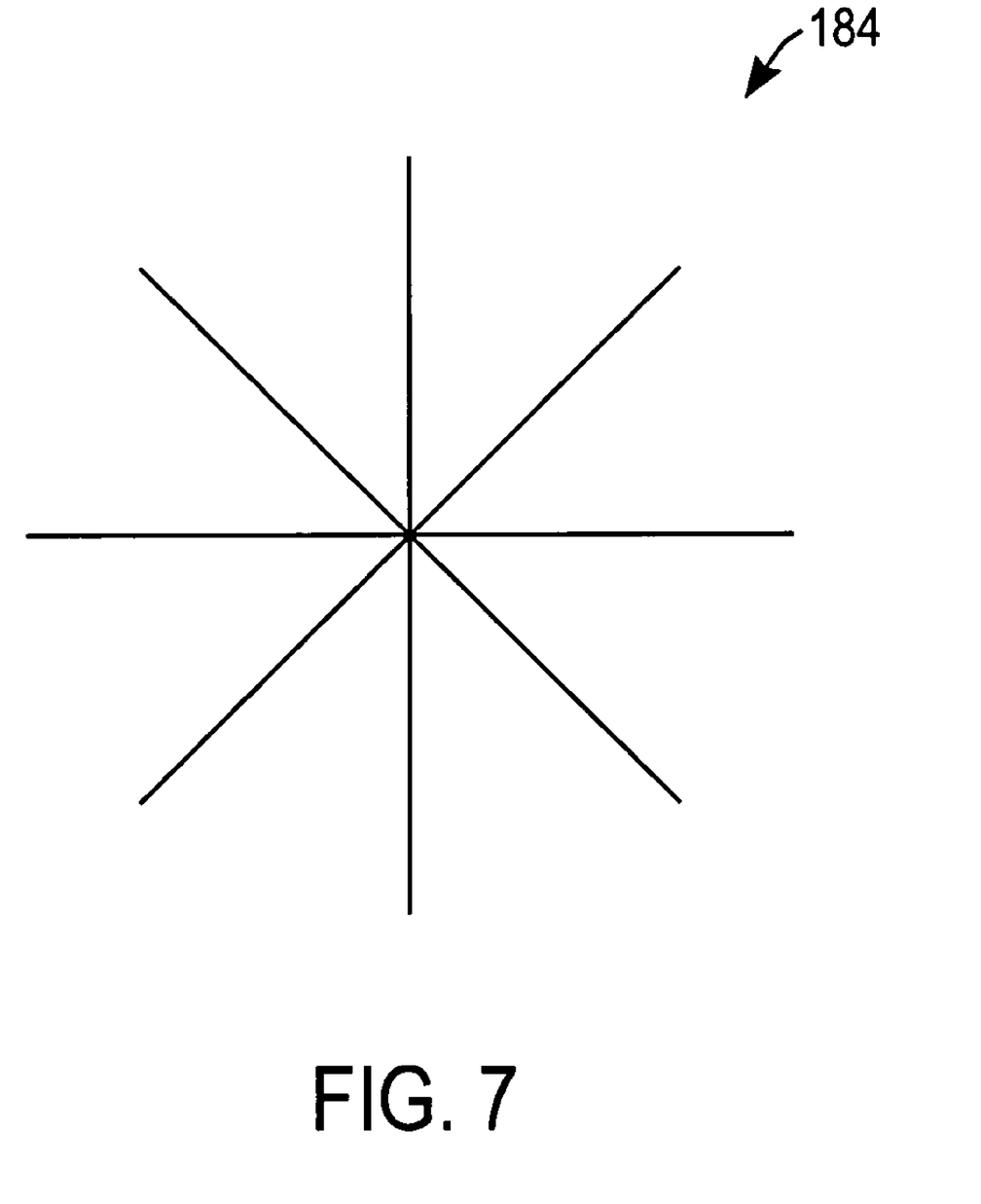
FIG. 7 illustrates a simple radial scanning pattern in accordance with another embodiment of the present invention.

FIG. 7 illustrates a simple radial scanning pattern 184 in accordance with another embodiment of the present invention. Here, scan paths are simply segments that radiate outwardly from the center location. Each of the scanning patterns 126, 142, 162, 182, and 184 mentioned previously has comprised of multiple scan paths having different shapes but generally radiate outwardly from a center location. Thus, each of these scanning patterns 126, 142, 162, 182, and 184 can be described as having a radial base motion and a secondary motion characterized as zig-zag, sinusoidal, constant-curve, rectangular, and simple, respectively. Other types of secondary motion can also be constructed. Furthermore, as discussed below, scanning patterns which do not have a radial base motion are also defined in accordance with the present invention.

Spiral Scanning Pattern

Figure 8A:
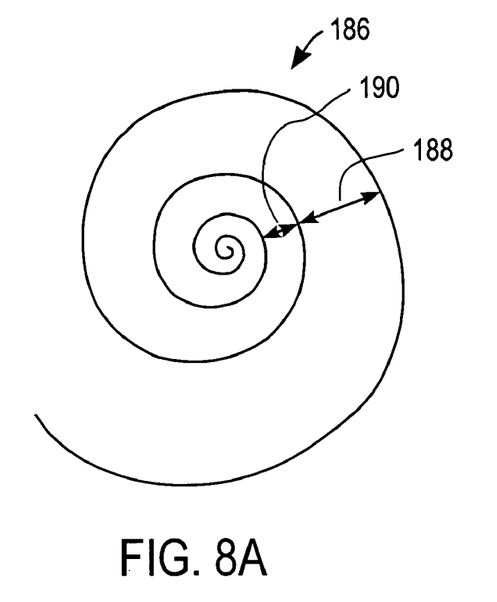
FIG. 8A illustrates a spiral scanning pattern in accordance with another embodiment of the present invention.

FIG. 8A illustrates a spiral scanning pattern 186 in accordance with another embodiment of the present invention. The spiral scanning pattern begins at a center location and spirals around and away from the center location. According to this embodiment of the invention, the distance between adjacent spiral paths can be varied to control the density with which samples are collected from the scanned area.

In particular, by increasing the spacing between adjacent spiral paths as a function of distance away from the center location, the spiral scanning pattern 186 achieves variable scanning density that decreases with distance away from the center location. For example, the spacing 188 between adjacent spiral paths is further from the center location than the spacing 190 between adjacent spiral paths. The spacing 188 corresponds to a scanning density that is less dense than that of the spacing 190. In such a manner, the spiral scanning pattern 186 can be designed to take advantage of known information regarding the region of interest. As discussed previously, such known information can include probability information relating to the position of a target structure.

Figure 8B:
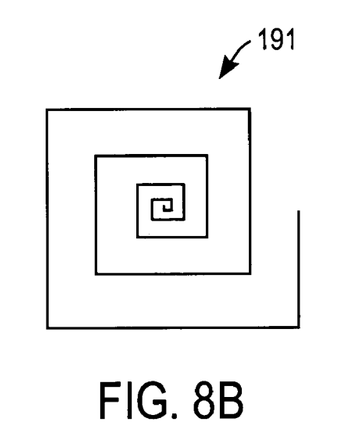
FIG. 8B illustrates another spiral scanning pattern in accordance with another embodiment of the present invention.

FIG. 8B illustrates another spiral scanning pattern 191 in accordance with another embodiment of the present invention. Here, the spiral scanning pattern 191 has a rectangular (more specifically, square) shape.

Spiral Zig-Zag Scanning Pattern

Figure 8C:
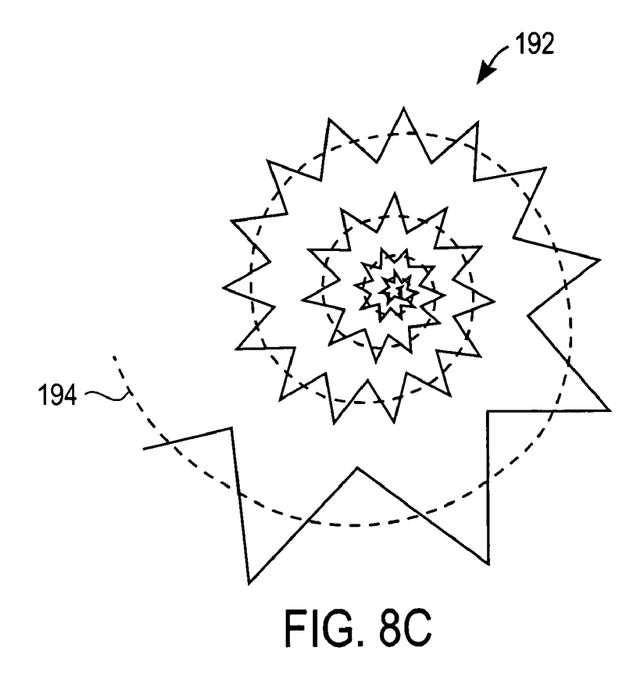
FIG. 8C illustrates a spiral zig-zag scanning pattern in accordance with another embodiment of the present invention.

FIG. 8C illustrates a spiral zig-zag scanning pattern 192 in accordance with another embodiment of the present invention. The spiral zig-zag scanning pattern 192 also begins at a center location and spirals around and away from the center location, much like the spiral scanning pattern 186. However, this pattern also incorporates a zig-zag trajectory similar to that described previously in relation to the radial zig-zag scanning pattern 126.

This zig-zag trajectory comprises consecutively connected linear segments. The linear segments each cross, at an angle, a general spiral line 194 that can be drawn from the center location. The path of the spiral line 194, the length of the linear segments, and the angle at which the linear segments cross the spiral line 194 can be varied to control the density with which samples are collected from the scanned area. In particular, the path of the spiral line 194 can be varied in a similar fashion as described previously for the spiral scanning pattern 186 of FIG. 8A. By making the line segments longer and more parallel to the spiral line 194, the density with which samples are collected can be decreased. Thus, the spiral zig-zag scanning pattern 192 can achieve variable scanning density that decreases with distance away from the center location. The pattern can be designed to take advantage of known information regarding the region of interest. As discussed previously, such known information can include probability information relating to the position of a target structure.

The spiral zig-zag scanning pattern 192 can be described having a spiral base motion resembling the spiral scanning pattern 186 and a secondary motion characterized as zig-zag. Other scanning patterns may have a spiral base motion but a different secondary motion such as sinusoidal, constant-curve, rectangular, and others can be constructed in accordance with the present invention. Alternatively, the spiral base motion may resemble the spiral scanning pattern 191, or others.

Non-Even Raster Scanning Pattern

Figure 9A:
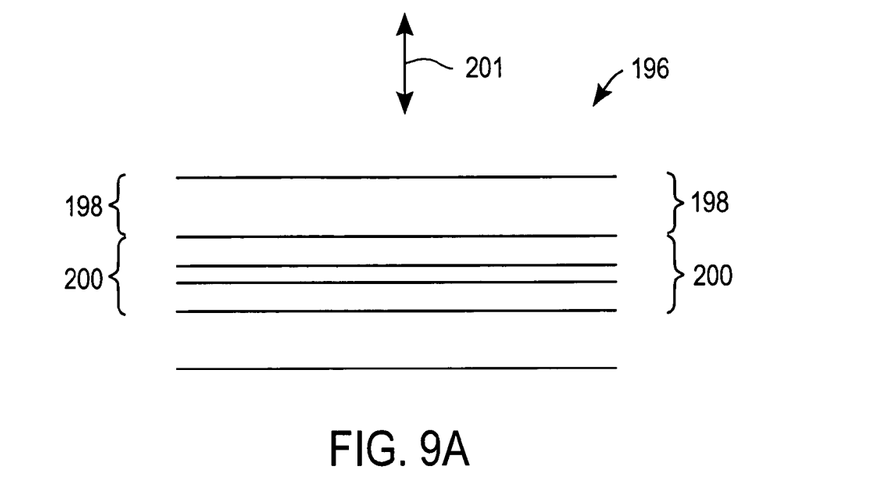
FIG. 9A illustrates a non-even raster scanning pattern in accordance with another embodiment of the present invention.

FIG. 9A illustrates a non-even raster scanning pattern 196 in accordance with another embodiment of the present invention. The non-even raster scanning pattern 196 comprises parallel scan paths separated by non-even spacing. By increasing the spacing between adjacent scan paths, the non-even raster scanning pattern 196 can decrease the number of samples per unit area, thus decrease the scanning density, in a particular area being scanned. For example, the area 198 has scan paths spaced further apart, and thus has less scanning density, than the area 200. Thus, scanning density can be varied along a Y axis 201 perpendicular to the parallel scan paths, in contrast to previously mentioned scanning patterns (which allow scanning density to be varied in a radial direction away from a center location). The non-even raster scanning pattern 196 can also be designed to take advantage of known information regarding a region of interest. Such known information can include probability information relating to the position of a target structure.

Non-Even Raster Zig-Zag Scanning Pattern

Figure 9B:
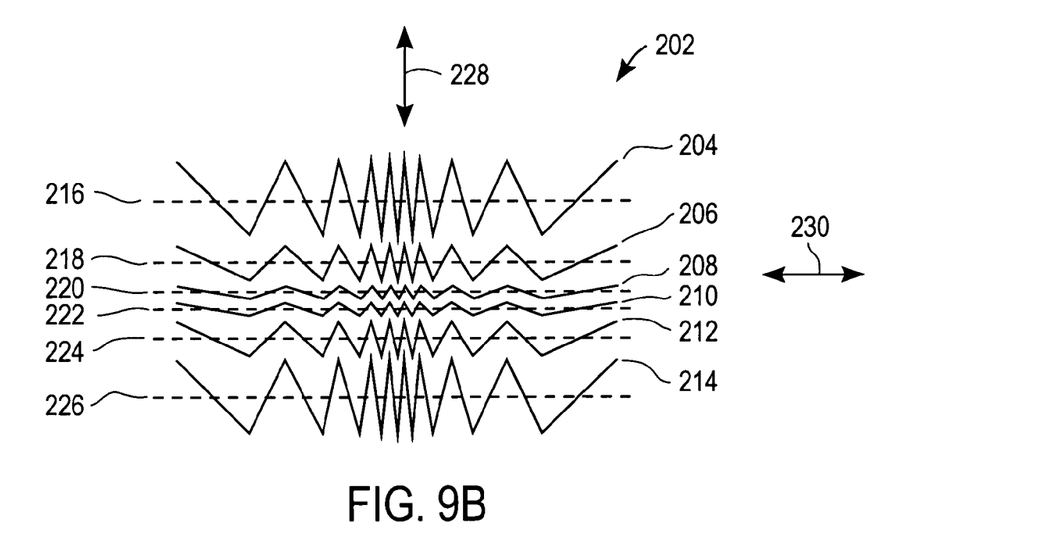
FIG. 9B illustrates a non-even raster zig-zag scanning pattern in accordance with another embodiment of the present invention.

FIG. 9B illustrates a non-even raster zig-zag scanning pattern 202 in accordance with another embodiment of the present invention. The non-even raster zig-zag scanning pattern 202 incorporates a number of zig-zag trajectories 204, 206, 208, 210, 212, and 214, which respectively corresponds to a number of parallel, non-evenly spaced lines 216, 218, 220, 222, 224, and 226 that can be drawn over the region of interest. For example, the zig-zag trajectory 204 corresponds to the parallel line 216.

Each zig-zag trajectory comprises consecutively connected linear segments. Each linear segment crosses, at an angle, the parallel line corresponding to the particular zig-zag trajectory. Thus, the zig-zag trajectory 204 includes linear segments, each of which crosses the parallel line 216 at a particular angle. The other zig-zag trajectories have a similar structure.

The density with which samples are collected from the scanned area can be controlled by varying (1) the non-even spacing separating the parallel lines 216, 218, 220, 222, 224, and 226, (2) the lengths of the linear segments, and (3) the angles at which the linear segments cross the corresponding parallel line. In particular, the non-even spacing separating the parallel lines 216, 218, 220, 222, 224, and 226 can be varied along a Y axis 228, in a similar fashion as described previously for the non-even raster scanning pattern 196 of FIG. 9A. By making the line segments longer and more parallel to the corresponding parallel line, the density with which samples are collected can be decreased. Thus, the scanning density can also be varied along an X axis 230. The non-even raster scanning pattern 202 can also be designed to take advantage of known information regarding a region of interest. Such known information can include probability information relating to the position of a target structure.

The non-even raster scanning pattern 202 can be described having a non-even raster base motion and a secondary motion characterized as zig-zag. Other scanning patterns having a non-even raster base motion but a different secondary motion such as sinusoidal, constant-curve, rectangular, and others can be constructed in accordance with the present invention.

Predicted Scan

According to one embodiment of the invention, a scanning technique referred to as predicted scan includes the steps of (1) moving the tip of a measurement device along at least one predefined path in a region of interest, (2) collecting information using the tip at sample points along the predefined path until at least one measurement based on the information collected reaches a target value or range of values, (3) once the measurement reaches the target value or range of values, moving the tip along a tracking path for tracking the measurement at the target value or within the target range of values; and (4) collecting information using the tip at sample points along the tracking path until the tip returns to a previously visited location on the tracking path or until the tip reaches a border of the region of interest. The measurement detected and tracked in this manner can be surface height, sidewall location, convex weighted limit, concave weighted limit, temperature, light intensity, tunnel current, electrical field strength, magnetic field strength, and/or others. The predefined path initially followed by the tip of the measurement device can be one of the scanning patterns previously discussed or a random search pattern.

Figure 10:
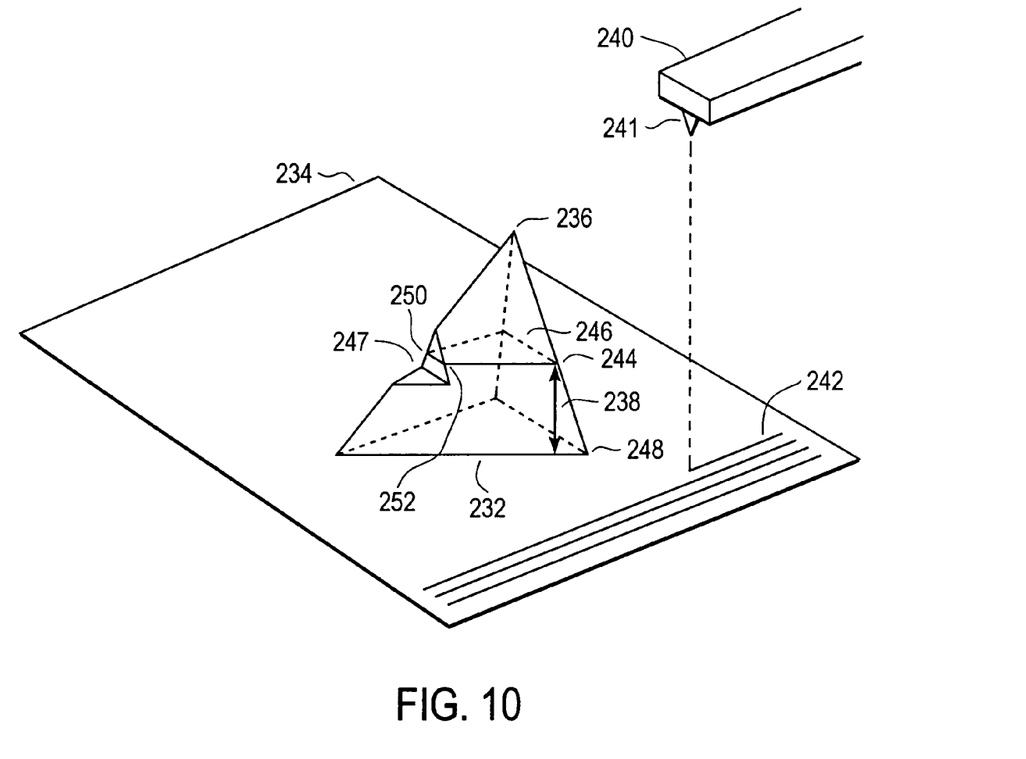
FIG. 10 is a perspective view of a pyramidal structure in a region of interest illustrating a predicted scan technique in accordance with one embodiments of the present invention.

FIG. 10 is a perspective view of a pyramidal structure 232 in a region of interest 234 illustrating a predicted scan technique in accordance with one embodiments of the present invention. Surface height is chosen as the parameter to be measured in this illustrative example. The object of this particular predicted scan technique is to search for a target surface height of 238 within the region of interest 234 and track the target surface height along a tracking path. As seen in FIG. 10, most of the region of interest 234 is characterized by a surface height of zero. However, the region of interest 234 includes the pyramidal structure 232, which attains and exceeds the target surface height 238 in certain regions. The pyramidal structure 232 has a triangular base and three triangular sides. The triangular sides intersect at a tip 236 at the top of the pyramidal structure 232.

This predicted scan technique begins by collecting surface height measurements using a measurement device 240 having a tip 241 that is moved along a predefined path, here a conventional raster scan pattern 242, over the region of interest 234. When the tip 241 comes to a position directly over the point 244, it detects for the first time a measurement that meets the target surface height 238. Upon finding the target surface height 238, the tip 241 moves to track the target height 238, defining a tracking path 246 of constant height 238 that begins at the point 244, follows the outer surface of the pyramidal structure 232, and returns to the point 244. The tip 241 takes measurements as it moves to follow the tracking path 246 until it returns to a position corresponding to the starting point 244.

The use of the predicted scan technique can dramatically reduce the amount of time needed to characterize a target structure or position a device to perform measurement and/or modification.

Predetermined Pattern Scan/Modification

According to one embodiment of the invention, a scanning technique referred to as predetermined pattern scan includes the steps of (1) moving a tip of a measurement device along a predefined path in a region of interest, (2) collecting information using the tip at sample points along the predefined path, (3) detecting a predetermined pattern within the region of interest using the collected information, (4) moving the tip to a desired location within the predetermined pattern.

The technique can further involve a measurement or modification that is performed using the tip at the desired location. Alternatively, the tip of the measurement device can move along an observation path defined with respect to the predetermined pattern and collect information using the tip at sample points along the observation path. The predetermined pattern can be based on various parameters, such as surface height, sidewall location, convex weighted limit, concave weighted limit, temperature, light intensity, tunnel current, electrical field strength, magnetic field strength, and others.

Referring again to FIG. 10, the pyramidal structure 232 can be used to illustrate a predetermined pattern scan technique in accordance with one embodiment of the present invention. Here, the measurement system searches for a predetermined pattern that is based on the parameter of surface height. The predetermined pattern of surface heights defines a pyramidal structure having a triangular base, three triangular sides, and a tip at the intersection of the three sides, much like the pyramidal structure 232. However, the pyramidal structure defined by the predetermined pattern does not include a defective notch 247, which does exist on the pyramidal structure 232. That is, the measurement system is expecting to find a perfect pyramidal structure of similar proportions.

This predetermined pattern scan technique begins by collecting surface height measurements using the measurement device 240 having a tip 241 that is moved along a predefined path, here a conventional raster scan pattern 242, over the region of interest 234. The measurement system continues in this manner until it collects sufficient surface height measurements to recognize a portion of the predetermined pattern, such as a particular base vertex 248 of the expected pyramidal structure. At this point, the system is able to calculate the position of the expected pyramidal structure within the region of interest 234. The system then moves the tip 241 of the measurement device 240 to a desired location within the predetermined pattern. Here, the desired location is the tip 236 of the expected pyramidal structure. Note that this location should also correspond to the tip 236 of the actual pyramidal structure 232, if the previous steps have been executed correctly. The tip 240 can then make measurements and/or perform modifications at the tip 236 of the actual pyramidal structure 232. The measurements can include those mentioned previously. The modifications can include addition, removal, or movement of material at the tip 236 of the pyramidal structure 232.

The system can also move the tip 241 along an observation path 246 that begins at the point 244. Here, the observation path 246 tracks a constant surface height 238. As the tip 241 moves along the observation path 246, it enters a region between points 250 and 252 that is characterized by the defective notch 247. In this region, the system detects a departure from the predetermined pattern. The defective notch 247 is not an expected feature because the predetermined pattern defines a perfect pyramidal structure that does not include the notch 247. The system responds by taking additional measurements and/or by making modifications to the pyramidal structure 232 as the tip 241 moves through this region of departure from the predetermined pattern. These measurements and modifications can include those mentioned previously.

Merged Scan

Figure 11:
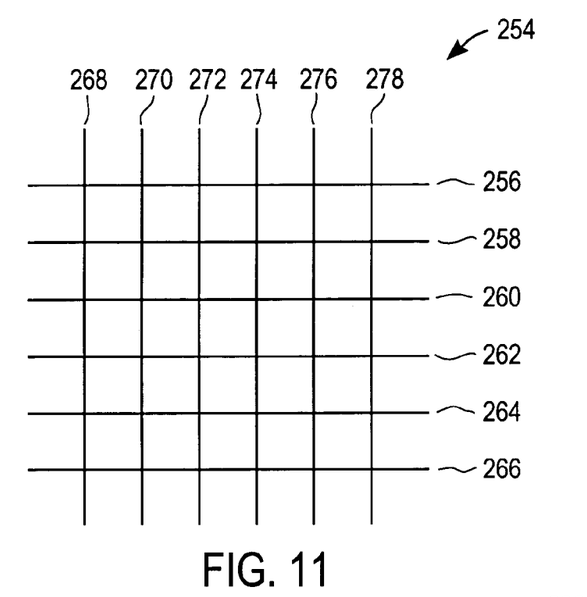
FIG. 11 illustrates a merged scanning technique in accordance with another embodiment of the present invention.

FIG. 11 illustrates a merged scanning technique in accordance with another embodiment of the present invention. The technique results in a merged scanning pattern 254 that is the combination of two raster scans. First, a raster scan is performed over a region of interest using parallel scan lines 256, 258, 260, 262, 264, and 266 orientated in a first direction. Then, a different raster scan is performed over the same region of interest using parallel scan lines 268, 270, 272, 274, 276, and 278 oriented in a second direction that forms a non-zero angle with the first direction. Here, the non-zero angle is a 90-degree angle.

This merged scan technique exploits the fact that many raster scan systems are capable of scanning along a large number of samples on a single scan line much faster they are capable of moving through a large number of scan lines. By utilizing two raster scans in different directions, this technique allows faster scanning along more than one axis. The technique can thus cover a region of interest in a more efficient manner.

Presentation of Merged Scan Results

Figure 12:
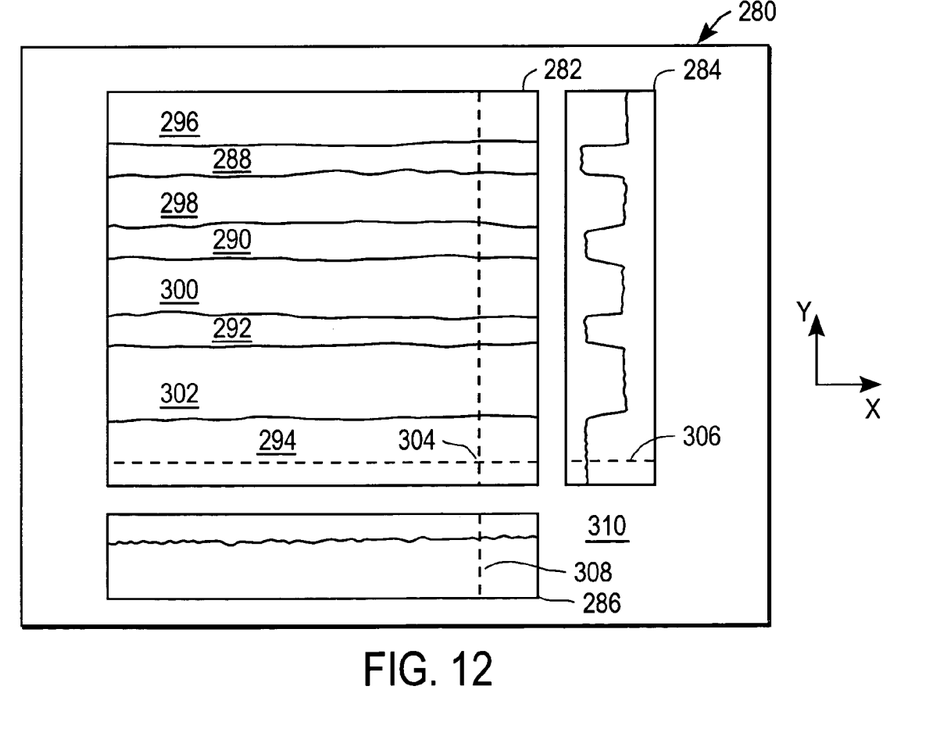
FIG. 12 demonstrates a technique for presenting merged scan results in accordance with another embodiment of the present invention.

FIG. 12 demonstrates a technique for presenting merged scan results in accordance with another embodiment of the present invention. A display area 280 includes a main window 282 and two active cross section windows 284 and 286. The picture presented in the main window 282 corresponds the surface structure of a particular region of interest that has been scanned using a merged scan technique described above. Here, the region of interest contains a number of parallel plateaus 288, 290, 292, and 294, separated by a number of parallel valleys 296, 298, 300, and 302.

The region of interest has been scanned using a merged scan pattern, such as the merged scanning pattern 254 of FIG. 11. The presentation system combines in software the results of scans performed according to the merged scanning pattern. Actual data is obtained along the scan lines in the X direction and scan lines in the Y direction distributed evenly over the region of interest. Interpolated data relating to areas between scan lines is calculated from the actual data. By combining both actual data and interpolated data, the picture shown in the main window 282 is formed. This two-dimensional picture thus represents three-dimensional data of surface height within the region of interest. The three-dimensional data can be displayed using different colors and/or different shades. By using a merged scan and interpolation between actual data points, the presentation system allows a detailed image to be presented in the main window 282 without requiring an exhaustive scanning sequence to cover every data point shown in the main window 282.

The presentation system allows the user to move an active cursor 304 (shown as a cross-hair type cursor) to any position within the main window 282. The position of the active cursor 304 determines the contents of the cross section windows 284 and 286. Specifically, the active cross section window 284 displays the actual data collected from the Y-direction scan line that is closest to the current position of the active cursor 304. In addition, the active cross section window 284 also displays a projection 306 of the current Y-axis position of the active cursor 304. At the same time, the active cross section window 286 displays the actual data collected from the X-direction scan line that is closest to the current position of the active cursor 304. In a similar fashion, the active cross section window 286 also displays a projection 308 of the current X-axis position of the active cursor 304.

The presentation system allows a user to make very accurate relative measurements using the main window 282 and the active cross section windows 284 and 286. Specifically, the user can position measurement cursors (not shown) within the main window. Much like the active cursor, each measurement cursor is displayed as a cross hair cursor within the main window and as a projection in each of the cross section windows 284 and 286. Thus, each measurement cursor can be accurately positioned by the user. Relative measurements between measurement cursors, such as X-axis distance, Y-axis distance, and straight-line distance, can be presented to the user at one or more locations such as the location 310. Similarly, relative measurements can be made between the active cursor 304 and a measurement cursor. In addition, the absolute positions of the various cursors can also be presented. The active cursor 304 and the measurement cursors can be visually differentiated using different colors. Various relative position measurements and absolute position measurements can also be identified using different colors.

CONCLUSION

Although the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims. For example, while the different scanning patterns mentioned above have been illustrated as two-dimensional embodiments, they can also be extended to three-dimensional patterns in accordance with the present invention.

What is claimed is:

1. A method for collecting information from a region of interest using a scanning probe microscope (SPM) having a tip, the method comprising:

moving said tip along at least three predefined paths spanning said region of interest, the at least three predefined paths being distributed around a center location with respect to said region of interest such that each one of the at least three predefined paths extends from the center location to a peripheral location with respect to said region of interest without returning to the center location, each one of the at least three predefined paths crossing a radial line at least three times at non-zero angles, each radial line extending from the center location to a peripheral location with respect to said region of interest, each radial line having a different angle with respect to said region of interest; and collecting information using said tip at a plurality of sample points along said at least three predefined paths.

2. The method of claim 1, wherein each of said predefined paths follows a zig-zag trajectory.

3. The method of claim 2, wherein said zig-zag trajectory comprises a plurality of contiguously connected linear segments, each of said continuously connected linear segments crossing said radial line.

4. The method of claim 3, wherein said linear segments are variably sized as a function of distance from said center location such that said linear segments are longer as distance from said center location increases.

5. The method of claim 3, wherein at least one pair of said contiguously connected linear segments forms a turn angle between the pair of contiguously connected linear segments to define a turn in at least one of said predefined paths.

6. The method of claim 5, wherein density with which said sample points cover said region of interest is increased by decreasing said turn angle.

7. The method of claim 5, wherein density with which said sample points cover said region of interest is increased by shortening at least one of said contiguously connected linear segments.

8. The method of claim 5, wherein density with which said sample points cover said region of interest is increased by orienting at least one of contiguously connected linear segments to be more perpendicular to said radial line.

9. The method of claim 1, wherein said at least three predefined paths are distributed evenly around said center location in said region of interest.

10. The method of claim 1, wherein said information relates to a characteristic selected from the group consisting of surface height, sidewall location, temperature, light intensity, tunnel current, electrical field strength, and magnetic field strength.

* * * * *